United States Patent [19]

Kato et al.

[11] Patent Number: 4,503,181

[45] Date of Patent: Mar. 5, 1985

[54] CURABLE COMPOSITION

[75] Inventors: Yasushi Kato; Hisao Furukawa, both of Kobe; Saori Nakatsuka, Ashiya, all of Japan

[73] Assignee: Kanegafuchi Kagaku Kogyo Kabushiki Kaisha, Osaka, Japan

[21] Appl. No.: 531,447

[22] Filed: Sep. 12, 1983

Related U.S. Application Data

[63] Continuation of Ser. No. 331,781, Dec. 17, 1981, abandoned, which is a continuation of Ser. No. 127,216, Mar. 4, 1980, abandoned.

[30] Foreign Application Priority Data

Mar. 5, 1979 [JP] Japan .................................. 54-25728

[51] Int. Cl.$^3$ ................................................ C08K 5/05
[52] U.S. Cl. ..................................... 524/391; 526/279
[58] Field of Search ........................ 524/391; 526/279

[56] References Cited

U.S. PATENT DOCUMENTS 4,157,321  6/1979  Kawakami ........................ 260/29.1

Primary Examiner—Paul R. Michl
Attorney, Agent, or Firm—Moonray Kojima

[57] ABSTRACT

A composition which is curable upon exposure to moisture comprising an organic polymer having at least one silicon bonded hydrolyzable group and an alcohol, wherein the composition is storable for long periods of time without any substantial increase in its viscosity.

2 Claims, No Drawings

CURABLE COMPOSITION

This is a continuation of application Ser. No. 331,781 filed Dec. 17, 1981, abondoned, which continues Ser. No. 127,216, filed Mar. 4, 1980, abandoned.

BACKGROUND OF THE INVENTION

This invention relates to a composition comprising silyl group containing compounds having in their molecules at least one hydrolyzable silyl group; and the object of the invention is to improve the conservativeness or storability thereof.

Silyl group containing compounds have been used for various purposes, such as paints, coating agents, silane coupling agents, rubber adhesives, etc, utilizing the reactivity of the silyl group contained therein. Such compounds are disclosed, for example, in U.S. Pat. Nos. 3,015,637 and 4,097,436.

However, these silyl group containing compounds have the disadvantage that when stored, their viscosity tends to increase and eventually form a gel due to the reaction of the silyl group. Those silyl containing compounds which are designed to crosslink through hydrolysis or condensation reaction at normal or low temperatures upon exposure to moisture in air, show especially marked tendency to increase viscosity. To prevent this tendency, it is necessary to employ various strict conditions, such as, for example, maintaining the pH of the system at neutral point when storing, restraining the water content of the system at a very low level, sealing the system against water, etc.

SUMMARY OF THE INVENTION

The inventors have discovered that adding one or more alcohols to the silyl group containing compounds unexpectedly improves the conservativeness or storability thereof.

Thus, the present invention encompasses a method for improving the storability of silyl group containing compounds by adding one or more alcohols thereto, wherein the compounds have in their molecules at least one silyl group of the general formula

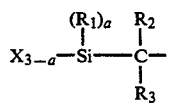

wherein, $R_1$, $R_2$ and $R_3$ is a hydrogen atom or a monovalent hydrocarbon group selected from alkyl, aryl, or aralkyl group having 1 to 10 carbon atoms, "X" is a group selected from alkoxy, acyloxy, aminoxy, phenoxy, thioalkoxy, or amino group, and "a" is an integral number 0,1, or 2. Unexpectedly, the addition of alcohol increases the duration of time which the silyl containing compound can be stored without any substantial increase in the viscosity thereof. The polymer most preferred for the present invention has two silicon bonded hydrolyzable group per one silicon atom.

DETAILED DESCRIPTION OF PREFERRED EMBODIMENTS

Any one or more aliphatic or aromatic alcohols may be used in this invention. However, in view of the evaporation rate in practical applications, the most preferred alcohols would be the aliphatic alcohols having 1 to 10 carbon atoms; such as, for example, methanol, ethanol, n-propanol, iso-propanol, n-butanol, and t-butanol. Although the quantity of alcohols to be used is not strictly specified, usually from one to 50 parts by weight of alcohol per 100 parts by weight of the silyl group containing compound is preferred.

The silyl group containing compounds which may be used in this invention, although not strictly specified, include the following.

Silyl group containing polymers may be used, for example, polyesters, ether-ester block copolymers, diallyl phthalate polymers, copolymers of diaryl phthalate and vinyl monomers, and vinyl polymers. These are produced by reacting organic polymers having carbon—carbon double linkages on their ends or side chains with hydrosilane through the reaction of $\sim$SiH+CH$_2$=C$\sim$ silicides through the reaction of $\sim$SiH+CH$_2$=C$\sim\rightarrow\sim$Si—CH$_2$—C$\sim$ in the presence of a Pt catalyst.

Polyesters having carbon-carbon double linkages on their ends or side chains can be produced by reacting for example, end hydroxyl group polyester (commercial name "Desmophene", product of Nippon Polyurethan Inc) with allyl chloride in the presence of such a base as sodium hydride. Such polyester can also be synthesized by conducting condensation reaction between dibasic acid and diols with addition of some quantity of allyl glycidylether as a diol component. In yet another way, they can be obtained by ester-exchanging of end-hydroxyl group polyesters and dially esters such as diallyl phthalate in the presence of such ester exchanging catalyst as toluene sulfonic acid. They can also be obtained by condensing dibasic acid and diols under condition of excess acid content and then by adding aryl alcohol, either during or after the former reaction for esterification.

Polyesters having within their molecules allyl-type olefinic group can also be obtained by reacting acid anhydride, epoxy compounds and allyl type alcohols in the presence of tertiary or quaternary ammonium salts and thereby adjusting molecular weight by use of alcohol and simultaneously introducing the allyl group. It is also possible to use allyl glycidyl ether instead of epoxy compounds.

Polyesters containing end-acryloil (or methacryloil) group can be obtained by a well known method of condensing diol, dibasic acid and acrylic acid (methacrylic acid). Ether-ester block copolymers having carbon-carbon double linkages can be obtained by condensing polybasic acid and polyalcohol in the presence, for example, of polyester having hydroxyl group on its end, with the addition of a small quantity of allyl glycidyl ether as a part of the polyalcohol component. The copolymers can also be obtained by condensing polyesters, as polyalcohol component, which have hydroxyl group in their ends, and polybasic acid in the presence of allyl alcohols in the same manner. The ether-ester block copolymer can be obtained by copolymerizing alternatively epoxy compounds which contain some quantity of allyl glycidyl ether in part and carboxylic acid anhydride, using such catalysts as tertiary amine, etc, in the presence of polyether which contains hydroxyl group on its end.

It is also possible to produce the block copolymers by condensing polybasic acid and poly alcohols which, in this case, is end-hydroxy group polyether having carbon-carbon double linkages which is produced by conducting ring-opening copolymerization between allyl glycidyl ether and epoxy compounds.

Diallyl phthalate compounds which contains carbon-carbon double linkages include diaryl phthalate monomers or prepolymers. Use of marketed compounds is also possible. Copolymers of diallyl phthalate and acrylic ester or methacrylic ester having carbon—carbon double linkages are obtained by polymerizing with such radical initiators as azo-compounds, peroxide, etc, and the number of double linkages can be regulated by adjusting the quantity of diallyl phthalate used as copolymerization component.

Vinyl polymers which have carbon-carbon double linkages are obtained by radical copolymerizing allyl acrylate or allyl methacrylate in part in the process of producing copolymers of such vinyl compounds as styrene, alpha methylstyrene, acrylic acid and their esters, methacrylic acid and their esters, acrylamide, vinyl acetate, ethylene, and maleic anhydride.

Silicon hydride compounds include silane halides (such as trichlorosilane, methyldichlorsilane, dimethylchlorsilane, and phenyldichlorsilane), alchoxysilanes (such as trimethoxysilane, triethyoxysilane, methyldiethoxysilane, methyldimethoxysilane, and phenyldimethoxysilane), acyloxysilanes (such as methyldiacetooxysilane or phenyldiacetoxysilane), ketoxymethosilanes (such as bis (dimethylketoxymate)methylsilane and bis (cyclohexlketoxymate)methylsilane), and organopolysiloxane having at least one Si-H and Si-x linkage within a molecule.

When silane halides are used, the halides may be changed for other hydrolytic functional groups.

Other vinyl polymers containing silyl groups are produced by copolymerizing vinyl group containing silyl compounds (such as vinyltrimethoxysilane, γ-methacryloxytrimethoxysilane, and γ-methacryloxymethyldimethoxysilane) and vinyl compounds(such as styrene, alpha methyl styrene, acrylic acid and esters thereof, methacrylic acid and esters thereof, acrylamide, vinyl acetate, ethylene, and maleic anhydride.

Further, silyl group containing polymers can be obtained by reacting organopolymers containing epoxy group such as epoxy polymer or copolymers consisting of glycidyl methacrylate and vinyl group compounds, with γ-aminoporpyltrimethoxysilane, and by reacting such organopolymers as polyesters or vinyl group polymers containing carboxyl group, with γ-glycidoxypropyltrimethoxysilane.

The curable polymer thus prepared is employed for use in the form of a solution. When the polymer has a solid state or considerably high viscosity, a solvent should be mixed therewith in an amount sufficient to make the mixture a solution.

The amount of solvent can be determined conveniently, depending upon the kind and molecular weight of the polymer and the mode of practical usage.

Generally speaking, when the molecular weight of the polymer is between 500 to 15,000, more than 10 parts by weight of solvent per 100 parts by weight of the polymer may be used and taking the economical view in to consideration, not more than 1000 parts by weight of solvent is preferred.

Although any kind of solvent can be used if its has the ability to make the compounds dissolve, preferred embodiments are aromatic hydrocarbon such as toluene or xylene, ketone, such as methylisobutylketone and esters such as butylacetate or ethylacetate.

The following examples illustrate actual examples of the invention.

EXAMPLE 1

Various kinds of compounds having silyl group were prepared according to procedures set forth below in Runs 1 to 7, hereinbelow.

Run 1

148 g of phthalic anhydride, 46.4 g propylene oxide, 22.8 g of allyl glycidyl ether, 11.6 g of allyl alcohol, and 0.5 g of dimethyl benzyl amine were placed in a one liter metallic autoclave and reacted at 100° C. After 3 hours, 46 g of propylene oxide was added to mixture and the reaction was continued for another one hour. Thereafter, excess propylene oxide was removed and polyester of a molecular weight of 1200 was obtained. To 100 g of the resulting polyester, 9.5 g of acetic acid anhydride was added and the mixture was reacted at 120° C. for 2 hours for treating hydroxyl group in the polyester followed by removal of excess acetic anhydride under reduced pressure.

22.2 g of the thusly treated polyester, 0.0035 g of chloroplatinic acid and 8.65 g of methyl dichlorsilane were reacted at 80° C. for 3 hours followed by removal of excess dimethylchlorsilane under reduced pressure. Then, by adding 20 ml of methanol and 20 ml of methyl orthoformate to the polyester, and stirring the mixture at room temperature for 1 hour followed by removal of low boiling materials under reduced pressure, a silyl group containing polyester was obtained.

Run 2

Ether-ester block copolymers of a molecular weight of approximately 3000 was obtained by placing 40 g of polyethylglycol of a molecular weight of 1000, 29.6 g of phthalic anhydride, 9.2 g of allyl glycidyl ether and 10 g of 1,2-butylene oxide in a flask with reflux condenser, and then the mixture was reacted at 90° C. for 4 hours after adding 0.2 g of dimethyl benzylamine. Hydroxyl groups of the resulting copolymers were acetylated by adding 10 ml of acetic acid anhydride and a few drops of sulfuric acid to 50 g of the polymers, and then the mixture was stirred at 100° C. for 2 hours followed by removal of low boiling materials under reduced pressure.

To the resulting material, 6 ml of methyl dichlorsilane and 0.00002 g of chloroplatinic acid were added and the mixture was reacted at 90° C. for 3 hours followed by removal of low boiling materials under reduced pressure. Thereafter, by adding 10 ml of methanol and then 5 ml of methyl orthoformate to the materials and converting halogen functional groups on silicone into methoxyl group and removing excess methanol and methyl orthoformate, silyl group containing ether-ester block copolymers were obtained.

Run 3

100 g of diallyl phthalate prepolymer (marketed under the name DAP L, a product of Osaka Soda Co, Ltd, iodine value, appx. 80), 0.00001 g of chloroplatinic acid and 1 g of hydroquinone were dissolved into 100 ml of toluene. Adding 35 ml of methyl diethoxysilane to the solution, and reacting the mixture at 90° C. for 3 hours, silyl group containing diallyl phthalate prepolymers were obtained.

Run 4

Dropping a solution of 30 g of styrene, 16 g of arylmethacrylate, 20 g of methyl methacrylate, 19 g of n-butyl methacrylate, 14 g of butyl acrylate, 1 g of acrylic acid and 2 g of n-dodecyl mercaptane with 2 g of azobis isobutyronitrile being dissolved into these monomers, into 100 g of toluene, heated to 90° C. and then reacting the mixture for 10 hours, a vinyl group polymer having a molecular weight of 8000 and containing allyl type unsaturated group was obtained. On the infrared absorption spectrum of the resulting polymer, absorption by carbon-carbon double linkages at 1648 cm$^{-1}$ was observed.

After addition of 1.5 g of methyl dimethoxysilane and 0.0005 g of chloroplatinic acid, being dissolved into it, to 20 g of the vinyl copolymer solution containing the allyl type unsaturated residues, the mixture was reacted at 90° C. for 6 hours with sealing. With the disappearance of absorption at 1648 cm$^{31\ 1}$ on the infrared absorption spectrum of the resulting material, a silyl group containing vinyl polymer was obtained.

Run 5

A silyl group containing dially phthalate polymer was obtained by conducting reacting in the same manner as in Run 4, except that 31 g of dially phthalate was used instead of 16 g of allyl methacrylate.

Run 6

Into 100 g of toluene heated to 100° C., was dropped a solution of 30 g of styrene, 27 g of γ-methacryloxy propyl trimethoxysilane, 20 g of methyl methacrylate, 19 of n-butyl methacrylate, 14 g of butyl acrylate, 1 g of acrylic acid and 2 g of n-dodecyl mercaptan with 2 g of azibisisobutyronitrile being dissolved in the monomers. The mixture was then reacted for 10 hours, and a silyl group containing vinyl polymer of a molecular weight of 9000 was obtained.

Run 7

γ-methacryloxytrimethoxy silane which was available on the market was used.

To each 100 parts of weight of the thusly prepared compounds in each of Runs 1 through 7, 10 parts by weight of the alcohol shown in Table 1, was added to form a mixture. The mixture was then diluted with toluene so that the compounds content of the resulting mixture solution was 50% by weight. The water content of the solution was adjusted to 100 ppm. The solution was sealed and stored at 50° C. for one month in order to determine the increase, if any, of the viscosity of the solution.

For comparison, another procedure was followed in the same manner as above except that no alcohol was added to any of the compounds prepared in the Runs 1 through 7.

The observed results are shown in Table 1.

Table 1 illustrates conclusively the surprising effect of the use of alcohol in accordance with the invention. The solutions wherein alcohol is employed, shows no increase in viscosity, or at most a negligible increase in viscosity. On the other hand, in the Comparative Example, wherein no alcohol is used, the solutions become gel after a one month storage period.

TABLE 1

| | | Example | Comparative Example |
|---|---|---|---|
| Run | Alcohol used | Increase in Viscosity | Increase in Viscosity |
| 1 | methanol | hardly | Gelled |
| 2 | n-butanol | hardly | gelled |
| 3 | ethanol | slightly | gelled within 1 week |
| 4 | methanol | hardly | gelled |
| 5 | ethanol | hardly | gelled |
| 6 | methanol | slightly | gelled within 1 week |
| 7 | methanol | slightly | gelled |

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A method of storing a polymer having a silyl group for long periods of time without any substantial amount of increase in the viscosity of said polymer, consisting of mixing 100 parts by weight of said polymer, said polymer having at least one silyl group per molecule having the formula:

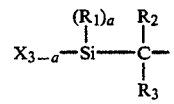

wherein R, R$_2$, R$_3$ is a hydrogen atom or a monovalent hydrocarbon group selected form alkyl, aryl, or aralkyl group having 1 to 10 carbon atoms, X is a group selected from alkoxy, acryloxy, aminooxy, phenoxy, thioalkyoxy, or amino group, and a is an integer 0, 1 or 2, with about 10 to 50 parts by weight of a stabilizer consisting of one or more aliphatic or aromatic monohydric alcohol having 1 to 10 carbon atoms; and wherein said polymer is a member selected from the group consisting of polyester, polether, ether-ester block copolymer, vinyl polymer, diallyl phthalate monomer or polymer, and a mixture thereof; and wherein said polymer has a molecular weight of between 1,200 and 9,000.

2. A composition consisting of a stabilizer consisting of an alcohol and a polymer having at least one silyl group per molecule of the general formula:

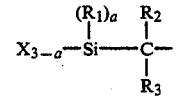

wherein R$_1$, R$_2$, R$_3$ is a hydrogen atom or a monovalent hydrocarbon group selected from alkyl, aryl or aralkyl group having 1 to 10 carbon atoms, X is a group selected from alkoxy, acyloxy, aminoxy, phenoxy, thioalkoxy or amino group, and a is an integer of 0, 1 or 2; and wherein said alcohol is one or more aliphatic or aromatic monohydric alcohol having 1 to 10 carbon atoms in an amount of from about 10 to 50 parts by weight to 100 parts by weight of said polymer; and wherein said polymer is a member selected from the group consisting of polyester, polyether, ether-ester block copolymer, vinyl polymer, diallyl phthalate monomer or polymer and a mixture thereof; and wherein said polymer has a molecular weight of between 1,200 and 9,000.

* * * * *